Patented Dec. 5, 1950

2,532,277

UNITED STATES PATENT OFFICE 2,532,277

1,6 HEXANEDIAMINE DERIVATIVES

John E. Castle, Wilmington, Del., assignor to E. I. du Pont de Nemours & Company, Wilmington, Del., a corporation of Delaware No Drawing. Application May 21, 1948, Serial No. 28,532

11 Claims. (Cl. 260—583)

This invention relates to catalytic hydrogenation processes and more particularly to the catalytic hydrogenation of dicyanobutenes.

It is an object of this invention to provide a new process for the catalytic hydrogenation of dicyanobutenes. A further object is to provide a process for the addition of an alcohol, ammonia, or an amine to a dicyanobutene accompanied by simultaneous hydrogenation of the nitrile groups. A still further object is to provide a one-step continuous process for the preparation of 3 - substituted - 1,6 - hexanediamines from dicyanobutenes. Other objects will appear hereinafter.

These objects are accomplished by continuously hydrogenating in an alkaline medium over a hydrogenation catalyst a dicyanobutene in the presence of an alcohol, ammonia, or a primary or secondary amine. In actual practice the hydrogenation is effected at a temperature in the range of 50° to 250° C. and at a pressure in excess of atmospheric.

According to the process of this invention when the hydrogenation is carried out in the presence of an alcohol there are obtained 3-substituted-1,6-diaminohexanes of the general formula:

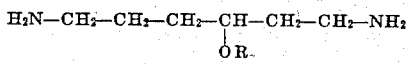

wherein R is the non-hydroxyl portion of an alcohol containing from 1 to 18 carbon atoms.

When the hydrogenation is effected in the presence of ammonia or a primary or secondary amine there are obtained 3-substituted-1,6-diaminohexanes of the general formula:

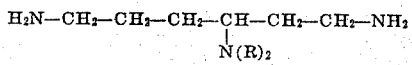

wherein R is hydrogen or the non-amino portion of a primary or secondary amine containing from 1 to 18 carbon atoms.

In actual practice the nitrile and alcohol, ammonia, or amine are mixed with hydrogen and continuously passed under alkaline conditions over a bed of hydrogenation catalyst, heated to the temperature selected for conducting the reaction, either cocurrently or counter-currently at a space velocity corresponding to between 0.1 and 1.0 gram of nitrile per cc. of catalyst per hour.

Theoretically 4 moles of hydrogen are required for the hydrogenation of the nitrile groups of the dicyanobutene to amine groups. In practice a large excess of hydrogen over the theoretical requirement is used and in continuous operation this excess is about 15 fold. The excess of hydrogen may be higher, such as 20 fold or more.

In the practice of this invention there may be used any hydrogenation catalyst which is active for converting nitrile groups to amino groups. Especially useful catalysts are nickel and cobalt.

Although the process may be operated at pressures somewhat in excess of atmospheric, it is preferred to carry out the process under superatmospheric pressures which are in excess of 400 lbs./sq. in., because reaction rate and yield of desired product are enhanced with increasing pressure up to a certain limit. For practical reasons pressures of the order of 20,000 lbs/sq. in. represent the upper pressure limit. From the standpoint of economy, yield per unit of catalyst, and reaction rate, pressures from 3000 to 10,000 lbs./sq. in. usually are employed.

The process may be carried out at temperatures of from 50° to 250° C. However, satisfactory reaction rates are attained at temperatures of from 75° to 150° C. and this range is regarded as the most useful.

The nitriles useful in the practice of this invention are 1,4 - dicyano - 1 - butene and 1,4 - dicyano-2-butene. The latter is obtained by reacting with HCN the mixture of dichlorobutenes obtained by the chlorination of butadiene-1,3, as described in the copending applications of G. M. Whitman, Serial No. 696,356, filed September 11, 1946, and Serial No. 696,357, filed September 11, 1946, and that of J. R. Johnson and G. M. Whitman, Serial No. 696,358, filed September 11, 1946, all of which have become abandoned. Whitman Patent 2,477,674 and Johnson and Whitman Patent 2,477,617, both issued August 2, 1949, are continuations-in-part of the aforesaid respective Whitman and Whitman and Johnson abandoned applications. The former is obtained from 1,4-dicyano-2-butene by rearrangement.

In the case of alcohols alkalinity is provided by addition of an alkali metal hydroxide such as sodium, potassium, and lithium hydroxides, that is hydroxides of alkali metals having an atomic number below 20. Sodium and potassium are the most useful because of their ready availability and relatively low cost. The amount of alkali employed is sufficient to maintain alkaline conditions, that is a pH in the reaction mixture of from 7 to 14 throughout the reaction period. This amount will generally be from 0.1% to 5% based on the weight of the nitrile. The alkali is generally dissolved in the alcohol and the solution then added to the nitrile. If desired, however, the alkali may be added to the mixture of nitrile and alcohol.

In the case of ammonia and amines it is unnecessary to employ added alkali because the ammonia and the amines contribute sufficient alkalinity to maintain the pH of the system between 7 and 14.

The alcohols useful in the practice of this invention may be primary or secondary or tertiary. The primary and secondary alcohols are preferred because of their availability and ease of reactivity with the dicyanobutene under the conditions of reaction existing in the process of this invention. Examples of suitable aliphatic alcohols are methyl, ethyl, amyl, decyl, dodecyl and octadecyl alcohols, etc., secondary butyl, secondary octyl, and secondary decyl alcohols, etc., tertiary amyl, tertiary heptyl, and tertiary decyl alcohols, etc. Examples of suitable aromatic alcohols are tolyl alcohol, benzyl alcohol, etc.; of cycloaliphatic alcohols are cyclohexanol, methyl cyclohexanol, etc.; and of ether alcohols are ethoxyethanol, ethoxyethoxyethanol, etc.

The amines may be primary or secondary and examples are methyl and ethyl amines, dodecyl amine, octadecylamine, diethylamine, diamylamines, methyldodecylamine, diocetylamine, etc., cyclohexylamine, dicyclohexylamine, benzylamine, dibenzylamine, methoxethylamine, piperidine, etc.

The amount of alcohol, ammonia, or amine employed is at least equimolar to the nitrile. If desired, however, larger amounts may be used, in which event it not only functions as a reactant but also as a reaction medium. In order to minimize formation of side reaction products when the reaction is carried out with ammonia or a primary amine it is important that the dicyanobutene and the ammonia or primary amine be brought into contact with each other immediately before reaction and not allowed to stand in contact with each other for any appreciable length of time beforehand. The presence of water effects a beneficial effect on the reaction and its use is therefore desirable.

Typical compounds obtainable by the process of this invention are 3-methoxy-1,6-hexanediamine, 3-cyclohexyloxy-1,6-hexanediamine, 3-octadecyloxy-1,6-hexanediamine, 3-ethoxy-1,6-hexanediamine, 3-ethoxyethoxy-1,6-hexanediamine, 3-decyloxy-1,6-hexanediamine, 3-benzyloxy-1,6-hexanediamine, 3-benzylamino-1,6-hexanediamine, 3-ethylamino-1,6-hexanediamine, 3-cyclohexylamino-1,6-hexanediamine, 3-ethoxyethylamino-1,6-hexanediamine, and the like.

The examples which follow are submitted to illustrate and not to limit this invention. Parts are by weight unless otherwise stated.

*Example I*

A vertically mounted steel cylinder capable of withstanding high pressures is charged with a layer of silica chips, 110 parts of 8–14 mesh reduced cobalt catalyst, prepared by the reduction of cobaltous oxide in hydrogen, and a zone of silica chips to serve as a preheating section for the incoming reactants. The top of the tube is fitted with lines for the simultaneous introduction of gaseous hydrogen and liquid reactant streams at controlled rates. The outlet end of the tube is connected to product separators and a suitable pressure let-down system. The steel tube is mounted in an electric furnace. A solution consisting of 5 parts 1,4-dicyano-2-butene, 0.05 part sodium hydroxide, and 95 parts methanol is introduced into the top of the tube at the rate of 240 parts per hour. A 15 to 20 fold excess of hydrogen at 540 to 600 atm. pressure is passed downward through the catalyst cocurrently with the alkaline dicyanobutene solution. The temperature of the catalyst zone is maintained at 120° C. Under these conditions 12 parts of the dicyanobutene is passed over 110 parts of catalyst each hour. During 6 hours running time 72.5 parts dicyanobutene is introduced. The methanol solution, obtained from the product separator, is fractionally distilled yielding 79 parts of 3-methoxy-1,6-hexanediamine, 13 parts hexamethylenediamine, a trace of hexamethylenimine, and 3 parts residue. The 3-methoxy-1,6-hexanediamine is a colorless liquid: B. P. 122.5° C./17 mm.; $n_D^{25}$ 1.4612; neutral equivalent 72.7. The quantity isolated corresponds to an 80% conversion.

The above example is duplicated except that ethylamine is substituted for the methanol. The product obtained is 3-ethylamino-1,6-hexanediamine.

*Example II*

Example I is duplicated, except that 240 parts of alkaline dicyanobutene solution, equivalent to 12 parts of 1,4-dicyano-2-butene, is passed over 55 parts reduced cobalt catalyst each hour. A 15 to 20 fold excess of hydrogen at 525 to 600 atm. pressure is passed cocurrently, and the temperature in the catalyst zone is maintained at 80° C. During five hours running time 60.0 parts of the dicyanobutene is introduced and the products obtained consist of 64 parts 3-methoxy-1,6-hexanediamine, corresponding to a 77% conversion, 2 parts hexamethylenediamine, 2 parts hexamethylenimine, and 12 parts residue.

*Example III*

Example I is duplicated, except that the alkaline 1,4-dicyano-2-butene solution and hydrogen are passed cocurrently upward through the catalyst bed. A total of 62.2 parts of the dicyanobutene is introduced over a period of 5 hours. The products obtained consist of 55 parts of 3-methoxy-1,6-hexanediamine, corresponding to a 65% conversion, 19 parts hexamethylenediamine, a trace of hexamethylenimine, and 4 parts residue.

*Example IV*

The procedure of Example I is duplicated using a solution containing 5 parts of 1,4-dicyano-2-butene, 0.05 part of sodium hydroxide, 0.05 part of water, and 95 parts of 2-ethoxyethanol. During a period of 6 hours a volume of this solution equivalent to 73.1 parts of 1,4-dicyano-2-butene is passed cocurrently with a 15 to 20 fold excess of hydrogen downward through the catalyst bed maintained at 120 C. The products consist of 42.4 parts of 3-(2-ethoxyethoxy)-1,6-hexanediamine, corresponding to a 30.1% conversion, 35.4 parts of hexamethylenediamine, 1.8 parts of intermediate distillation cuts, and 10.4 parts of high boiling residue. The 3-(2-ethoxyethoxy)-1,6-hexanediamine is a clear, colorless liquid boiling at 89° C. at 0.15 mm., $n_D^{25}$ 1.4591. $d^{25}$ 0.9531, neutral equivalent 102.

*Example V*

The procedure of Example I is duplicated, except that separate streams of anhydrous ammonia, hydrogen, and an aqueous solution containing 15% of 1,4-dicyano-2-butene are introduced simultaneously into the top of the reaction unit. During a period of 4 hours 405 parts of ammonia and a volume of aqueous solution equivalent to 116.4 parts of 1,4-dicyano-2-butene are passed cocurrently with an 8 fold excess of hydrogen downward through the catalyst bed maintained at 115° C. The products consist of 86.7 parts of 1,3,6-hexanetriamine, corresponding to a 53.3% conversion, 31.1 parts of a cyclized diamine, and 11 parts of high boiling residue. The 1,3,6-hexanetriamine is a clear, colorless liquid, boiling at 84 to 85° C. at 0.8 mm., $n_D^{25}$ 1.4866, $d^{25}$ 0.9421. Analysis: Calculated for $C_6H_{17}N_3$, C, 54.91; H, 13.06; N, 31.90; neutral equivalent 43.74; molecular refractivity 40.57. Found: C, 55.20; H, 13.13; N, 32.39; neutral equivalent 43.8; molecular refractivity 40.03.

*Example VI*

The procedure of Example I is duplicated using a solution containing 5 parts 1,4-dicyano-2-butene, 0.05 part sodium hydroxide, 0.05 part water, and 95 parts piperidine. During a period of 5 hours a volume of this solution equivalent to 59.2 parts 1,4-dicyano-2-butene is passed cocurrently with a 15 to 20 fold excess of hydrogen downward through the catalyst bed maintained at 120° C. The products consist of 47.9 parts 3-(1-piperidyl)-1,6-hexanediamine, corresponding to a 43.2% conversion, 8.6 parts low boiling liquid, 15.1 parts high boiling liquid, and 22.3 parts nondistillable residue. The 3-(1-piperidyl)-1,6-hexanediamine is a clear, colorless liquid: B. P. 102–103° C./0.32 mm.; $n_D^{25}$ 1.4928; $d^{25}$ 0.9458; neutral equivalent 66.7.

The hydrogenation catalysts may be pyrophoric or stabilized and either in the massive state, in the form of pellets, or fine powders, and may be extended on suitable supports such as carbon, pumice, silica, magnesia, etc. Such catalysts may be prepared by reducing with hydrogen, cobalt or nickel compounds such as the carbonate, oxide or hydroxide alone or admixed with oxygenated compounds of other metals known to form hydrogenating oxides, for example, copper, zinc, and the like, or by extracting with alkali, the alkali soluble component of an alloy of nickel or cobalt with an alkali soluble metal as described in U. S. Patent 1,628,190, or by reducing a cobalt salt or a nickel salt with sodium naphthalene as disclosed in U. S. Patent No. 2,177,412. Stabilized nickel and cobalt catalysts may be prepared by exposure of pyrophoric nickel or cobalt to an oxidizing atmosphere while maintaining the temperature of the catalyst mass below 50° C. Supported nickel and cobalt catalysts may be prepared by adding the supporting material during the catalyst preparation or the support may be formed during the catalyst preparation. Usually the catalysts are used in granular form.

The products obtained in accord with the process of this invention are useful as polyamide intermediates. For example, by reacting the diamines with dicarboxylic acids, polymeric amides are obtained. Thus, the polyamide from 3-methoxy-1,6-diaminohexane and 3-hydromuconic acid softens at 95° C., is soluble in water and can be spun into fibers. The polyamide from 3-methoxy-1,6-diaminohexane and the phenyl ester of terephthalic acid has a softening point of 210° C. and when a film thereof is immersed in water it shows a water-absorption of 11.2% at equilibrium. These products are also useful as dye intermediates, surface active agents, rubber chemicals, corrosion inhibitors, pharmaceuticals, and the like.

As many apparently widely different embodiments of this invention may be made without departing from the spirit and scope thereof, it is to be understood that the invention is not limited to the specific embodiments thereof except as defined in the appended claims.

I claim:

1. A process for the simultaneous addition of a compound to a double bond of a 1,4-dicyanobutene and hydrogenation of the nitrile groups thereof to amino groups, which comprises passing continuously under alkaline conditions over a hydrogenation catalyst selected from the group consisting of cobalt and nickel hydrogenation catalysts at a temperature in the range of 50° to 250° C. and under a pressure in excess of 400 lbs./sq. in. a mixture of a 1,4-dicyanobutene, hydrogen and a compound selected from the group consisting of monohydric alcohols of not more than 18 carbon atoms which are entirely hydrocarbon except for the hydroxyl oxygen, monohydric ether alcohols which are entirely hydrocarbon except for the ether and hydroxyl oxygens, ammonia, primary and secondary monoamines of not more than 18 carbon atoms which are entirely hydrocarbon except for the amino nitrogen, and primary monoamines of not more than 18 carbon atoms in which a lower alkoxy lower alkyl radical is attached to the amino nitrogen and which are entirely hydrocarbon except for ether oxygen and the amino nitrogen.

2. A process for the simultaneous addition of an alcohol to the double bond of a 1,4-dicyanobutene and hydrogenation of the nitrile groups thereof to amino groups, which comprises passing continuously under alkaline conditions a mixture of a 1,4-dicyanobutene, hydrogen, a monohydric alcohol of not more than 18 carbon atoms which is entirely hydrocarbon except for the hydroxyl oxygen and a hydroxide of an alkali metal having an atomic number below 20 over a hydrogenation catalyst selected from the group consisting of cobalt and nickel hydrogenation catalysts at a temperature in the range of 50° to 250° C. and under a pressure in excess of 400 lbs./sq. in.

3. A process for the simultaneous addition of ammonia to the double bond of a 1,4-dicyanobutene and hydrogenation of the nitrile groups thereof to amino groups, which comprises passing continuously under alkaline conditions a mixture of a 1,4-dicyanobutene, hydrogen and ammonia over a hydrogenation catalyst selected from the group consisting of cobalt and nickel hydrogenation catalysts at a temperature in the range of 50° to 250° C. and under a pressure in excess of 400 lbs./sq. in.

4. A process for the simultaneous addition of a secondary amine to the double bond of a 1,4-dicyanobutene and hydrogenation of the nitrile groups thereof to amino groups, which comprises passing continuously under alkaline conditions a mixture of a 1,4-dicyanobutene, hydrogen, and a secondary monoamine of not more than 18 carbon atoms which is entirely hydrocarbon except for the amino nitrogen over a hydrogenation catalyst selected from the group consisting of cobalt and nickel hydrogenation catalysts at a temperature in the range of 50° to 250° C. and under a pressure in excess of 400 lbs./sq. in.

5. A process for the simultaneous addition of a compound to the double bond of a 1,4-dicyanobutene and hydrogenation of the nitrile groups thereof to amino groups as set forth in claim 1 in which the 1,4-dicyanobutene is 1,4-dicyanobutene-2 and the hydrogenation catalyst is a cobalt hydrogenation catalyst.

6. A process for the simultaneous addition of an alcohol to the double bond of 1,4-dicyanobutene-2 and hydrogenation of the nitrile groups thereof to amino groups, which comprises passing continuously under alkaline conditions a mixture of 1,4-dicyanobutene-2, hydrogen, a monohydric alcohol of not more than 18 carbon atoms which is entirely hydrocarbon except for the hydroxyl oxygen, and a hydroxide of an alkali metal having an atomic number below 20 over a cobalt hydrogenation catalyst at a temperature in the range of 50° to 250° C. and under a pressure in excess of 400 lbs./sq. in.

7. A process for the simultaneous addition of ammonia to the double bond of 1,4-dicyanobutene-2 and hydrogenation of the nitrile groups thereof to amino groups, which comprises passing continuously under alkaline conditions a mixture of 1,4-dicyanobutene-2, hydrogen and ammonia over a cobalt hydrogenation catalyst at a temperature in the range of 50° to 250° C. and under a pressure in excess of 400 lbs./sq. in.

8. A process for the simultaneous addition of a secondary amine to the double bond of 1,4-dicyanobutene-2 and hydrogenation of the nitrile groups thereof to amino groups, which comprises passing continuously under alkaline conditions a mixture of 1,4-dicyanobutene-2, hydrogen and a secondary monoamine of not more than 18 carbon atoms which is entirely hydrocarbon except for the amino nitrogen over a cobalt hydrogenation catalyst at a temperature in the range of 50° to 250° C. and under a pressure in excess of 400 lbs./sq. in.

9. A process for the simultaneous addition of methanol to the double bond of 1,4-dicyanobutene-2 and hydrogenation of the nitrile groups thereof to amino groups, which comprises passing continuously under alkaline conditions a mixture of 1,4-dicyanobutene-2, hydrogen, methanol and sodium hydroxide over a cobalt hydrogenation catalyst at a temperature in the range of 50° to 250° C. and under a pressure in excess of 400 lbs./sq. in.

10. A process for the simultaneous addition of piperidine to the double bond of 1,4-dicyanobutene-2 and hydrogenation of the nitrile groups thereof to amino groups, which comprises passing continuously under alkaline conditions a mixture of 1,4-dicyanobutene-2, hydrogen, piperidine and sodium hydroxide over a cobalt hydrogenation catalyst at a temperature in the range of 50° to 250° C. and under a pressure in excess of 400 lbs./sq. in.

11. The chemical compound 1,3,6-hexanetriamine.

JOHN E. CASTLE.

REFERENCES CITED

The following references are of record in the file of this patent:

UNITED STATES PATENTS

| Number | Name | Date |
|---|---|---|
| 2,166,151 | Hawk | July 18, 1939 |
| 2,200,282 | Lazier | May 14, 1940 |
| 2,280,792 | Bruson | Apr. 28, 1942 |
| 2,284,525 | Larcher et al. | May 25, 1942 |
| 2,409,061 | Norris | Oct. 8, 1946 |
| 2,448,755 | Zellner | Sept. 7, 1948 |

FOREIGN PATENTS

| Number | Country | Date |
|---|---|---|
| 796,001 | France | Mar. 27, 1936 |

OTHER REFERENCES

Windaus et al.: "Ber. deut. Chem.," vol. 54, page 2751 (1921).

Degering: Organic Nitrogen Compounds (Univ. Lithoprinters, Ypsilanti, Mich., 1945), page 509, para. 1572.